Aug. 19, 1924.

L. BLACKMORE

FRICTION DRIVEN FARM TRACTOR

Filed Aug. 28, 1920   3 Sheets-Sheet 1

1,505,533

Inventor

Lloyd Blackmore

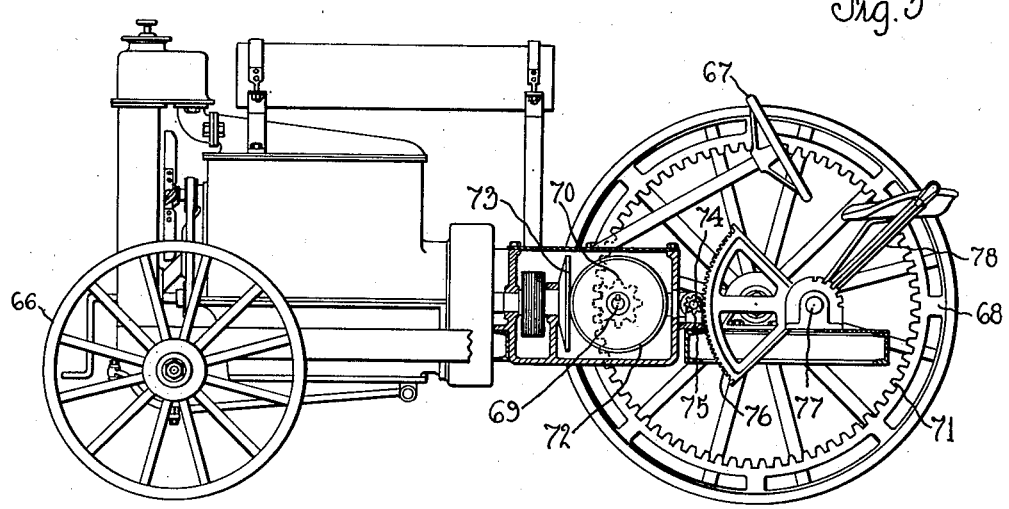
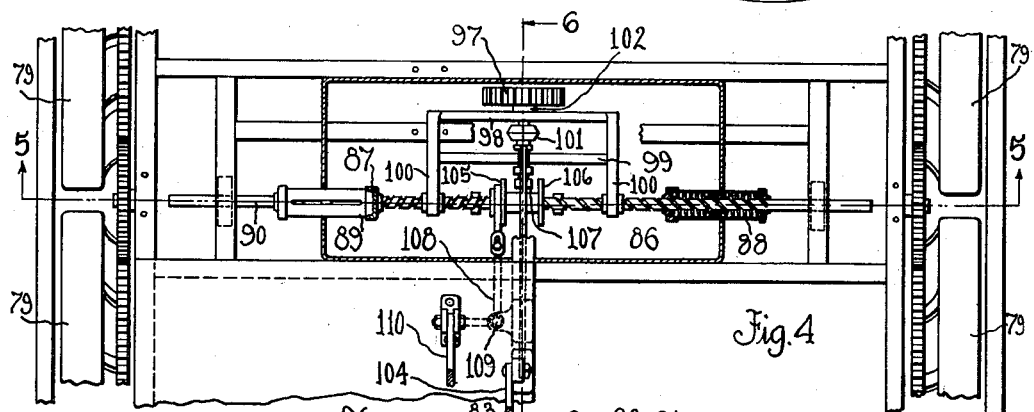
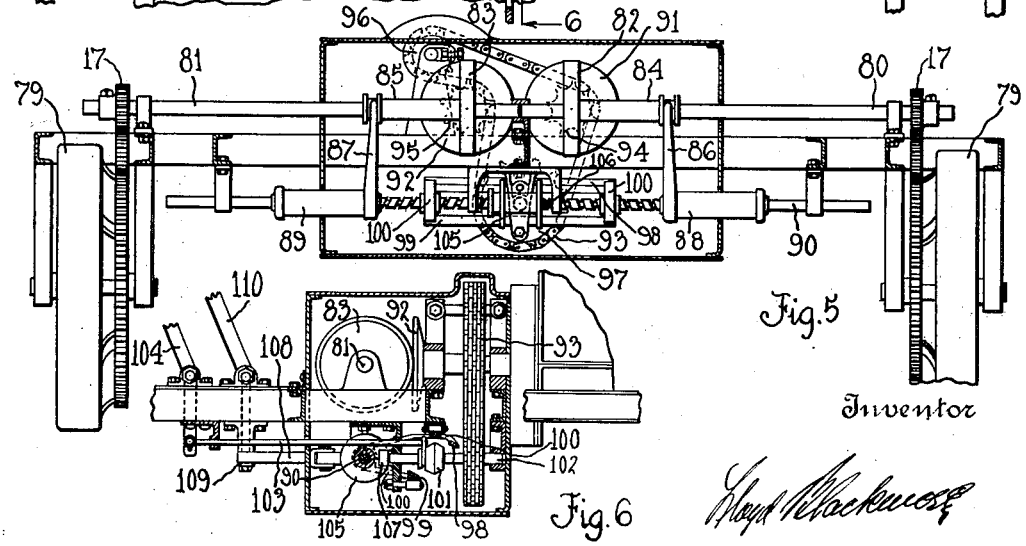

Aug. 19, 1924.                                                      1,505,533
L. BLACKMORE
FRICTION DRIVEN FARM TRACTOR
Filed Aug. 28, 1920        3 Sheets-Sheet 3

Inventor

Patented Aug. 19, 1924.

1,505,533

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

FRICTION-DRIVEN FARM TRACTOR.

Application filed August 28, 1920. Serial No. 406,677.

*To all whom it may concern:*

Be it known that I, LLOYD BLACKMORE, a subject of the King of Great Britain, and a resident of Highland Park, county of Wayne, and State of Michigan, have invented certain new and useful Improvements in Friction-Driven Farm Tractors, of which the following is a full, clear, concise, and exact description, such as will enable others skilled in the art to which the invention relates to make and use the same, reference being made therein to the accompanying drawings, which form a part of this specification.

My invention relates to tractors designed especially for agricultural purposes, and for hauling various kinds of agricultural implements, altho such tractors may as a matter of course be used for general hauling purposes.

The principal object of my invention is to provide improved transmission mechanism through which the driving wheels of the tractor are driven from the engine whereby the tractor is operated; such transmission mechanism being of the friction type wherein the driving is accomplished through two co-operating pairs of friction members in engagement with one another, and the character of the driving mechanism being such that the driving wheel or wheels upon each side of the tractor are driven independently of those upon the other side.

A further object of my invention is to provide improved transmission mechanism of the friction type above referred to and wherein means are provided for driving the driving wheels upon one side of the tractor faster than those upon the other side, to thereby effect the steering of the vehicle by varying the relative speed at which the driving wheels upon the two sides thereof are driven through the said transmission mechanism.

A further object of my invention is to provide transmission mechanism of the general type or class above referred to and wherein means are provided for simultaneously varying the speed at which the driving wheels are driven while maintaining the speed of the wheels upon each side of the vehicle uniform, together with means for simultaneously increasing the speed of the driving wheel or wheels upon one side of the vehicle and for decreasing the speed of the driving wheel or wheels upon the other side of the tractor; to thereby provide in a single transmission mechanism means for varying the speed at which the tractor is driven, and for also varying the relative speed of the driving wheels upon each side thereof to effect the steering of the vehicle.

A further object of my invention is to provide transmission mechanism of the general type or class above referred to and the character of which is such that the driving wheels of the tractor may be driven either in a forward or in a reverse direction; the wheels in either case being driven through the mechanism in question either uniformly as regards the wheel or wheels upon both sides of the tractor, or the wheel or wheels upon one side thereof being driven faster than those upon the other side.

With the above and other objects of invention in view my invention consists in the improved friction driving mechanism for farm and other tractors illustrated in the accompanying drawings and hereinafter described and claimed; and in such variations and modifications thereof, within the terms of the concluding claims, as will be obvious to those skilled in the art to which my invention relates.

Referring now to the drawings:

Figure 3 is a view partly in side elevation and partly in section showing my improved friction drive mechanism as applied to a different type of tractor than the type illustrated in Figures 1 and 2.

Figure 4 is a fragmentary view showing my improved friction drive mechanism modified as to certain of the features thereof.

Figure 5 is a similar view showing a section upon a vertical transverse plane indicated by the line 5—5, Figure 4.

Figure 6 is a fragmentary view showing a section upon a vertical longitudinally extending plane indicated by the line 6—6, Figures 4 and 5.

Figure 1:
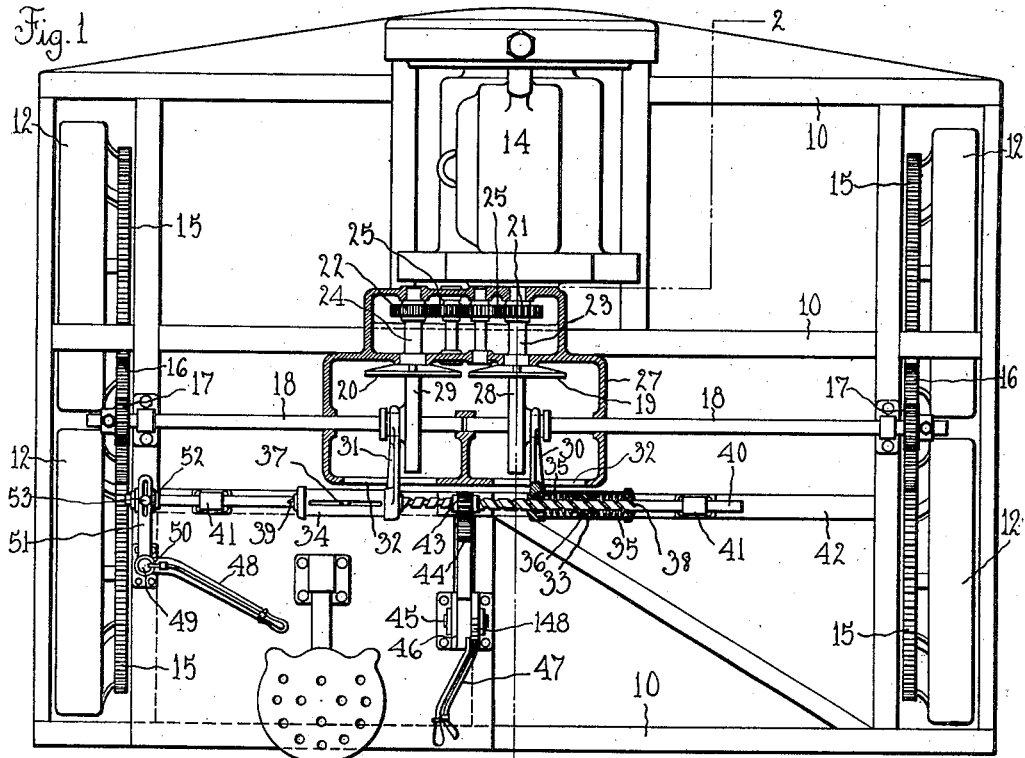
Figure 1 is a view showing a tractor equipped with my improved friction drive mechanism, the view as a whole being in plan and certain portions of the mechanism of the device being broken away to better bring out the features wherein my invention consists.
Figure 2:
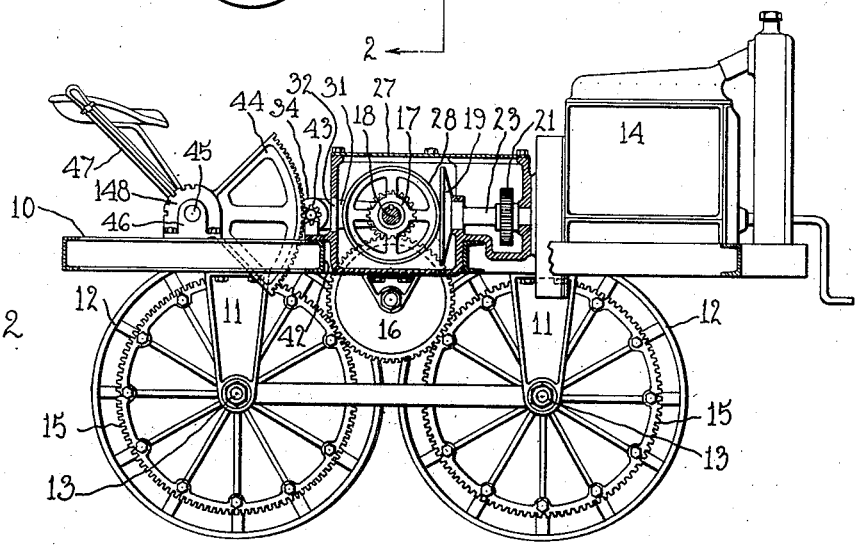
Figure 2 is a view showing the tractor shown in Figure 1 in section on vertical longitudinal planes the position of which is indicated by the broken line 2—2, Figure 1.

Referring first to the form of my invention illustrated in Figures 1 and 2, the reference numeral 10 designates the main frame of the tractor which will vary in form in different forms or types of tractor and with the particular construction of which my invention is in no way concerned, as the invention herein relates to the transmission mechanism intermediate the engine and the driving wheels of the tractor and as such is independent of the structural features of the frame or other parts of the tractor.

Depending from the frame 10 of the form of tractor illustrated in Figures 1 and 2 are a series of pairs of legs 11, two such legs being disposed one upon either side of each of the four driving wheels 12 present in the form of tractor here referred to; the said driving wheels being each separately rotatable upon a shaft 13 extending one between each pair of legs and each driving wheel being located between a pair of legs, so that the central portion of the tractor between the said driving wheels is open and unobstructed.

In the form of tractor illustrated in Figures 1 and 2 the four driving wheels 12 are all driven from the engine 14 which propels the tractor to which end each of said driving wheels is provided with an annular gear or rack 15, the two racks of the driving wheels upon each side of the vehicle being so located that both are engaged by an idler gear 16 which is supported from the frame of the tractor; and which idler gears are engaged and driven by driving pinions 17 secured to the outer ends of two driving shafts 18 arranged in line with one another, and which driving shafts are independent of one another so that the speed at which one is driven may be varied independently of the speed at which the other is driven to thereby effect the steering of the vehicle. The driving mechanism above referred to through which the two driving wheels upon each side of the tractor are driven from the driving shafts may, however, be varied, so long as the driving shafts in question are operatively connected one with the driving wheel or wheels upon each side of the tractor.

The reference numerals 19, 20 designate two rotatable friction discs which are driven from the engine 14 in opposite directions relative to one another, such reversal of rotation being secured in the embodiment of my invention illustrated by the use of gears 21, 22 fast upon the shafts 23, 24 whereby said friction discs are supported, and which gears are driven one from the other through idler gears 25; the several shafts whereby said elements are supported being rotatable in bearings provided in the walls of a housing 27, which housing is also provided with bearings which support the inner ends of the driving shafts 18. The shaft 23 is an extension of the crankshaft of the engine in the embodiment of my invention illustrated, altho such is not necessarily the case in my invention regarded in its broader aspect; and other forms of gearing may be employed for causing the two friction discs to rotate in opposite directions as my invention is in no way concerned with the specific mechanism employed for that purpose.

The reference numerals 28, 29 designate two friction wheels the peripheries of which are in engagement with the friction disc 19, 20 so as to be driven by said discs, and said wheels are operatively connected with the driving shafts 18, 18 so as to communicate motion thereto. These friction wheels are slidable along the shafts 18 but are connected with said shaft so as to communicate rotary motion thereto as by means of a key and slot driving connection, by making the shafts square and providing similar openings in the driving wheels for receiving the said shafts, or in other similar ways so long as the said wheels are operatively connected with the driving shafts and are at the same time movable across the faces of the driving discs.

Means are provided for moving the friction wheels 28, 29 across the faces of the friction discs 19, 20 simultaneously, and in opposite directions, to thereby vary the speed at which the shafts 18 will be driven from the friction discs, irrespective of the positions said friction wheels occupy measured outward or inward from the axes of rotation of the said friction discs; and for also simultaneously moving said friction wheels across the faces of the friction discs in one and the same direction to thereby vary the speeds at which the said driving shafts are individually driven to thereby steer the tractor; such mechanism being of the following construction in the embodiment of my invention illustrated.

The friction wheels 28, 29 are provided with grooved hubs which are engaged by the bifurcated ends of shifting yokes 30, 31 which operate in slots 32 provided in the casing 27, said arms or yokes being carried by sleeves 33, 34 within each of which two oppositely acting springs 35 are located; the outer ends of said springs abutting against the ends or heads of the sleeves while the inner ends thereof abut against nuts 36, 37 and hold the same each in a central position as regards said sleeves; said nuts being prevented from rotation by the sleeves and one of said nuts having a right-hand thread while the other has a left-hand thread. The nuts 36, 37 are in threaded engagement with the right and left-hand threaded portions 38, 39 formed upon a shaft 40, which shaft is rotatable about its axis and is also slidable along said axis in the direction of its length, said shaft being supported by bearings 41 carried by a cross-bar 42 of the frame.

Rotary motion is communicated to the shaft 40 through a pinion 43 in driving engagement therewith but through which pinion the shaft may slide as by means of a key and key-way connection between the parts, and said pinion is rotated to thereby rotate the shaft by means of a toothed segment 44 pivotally supported upon a suitable shaft or pin 45 the ends of which are supported by a bracket 46 supported by the frame of the tractor; said toothed segment having a speed controlling lever 47 whereby it may be operated, and a hand-operated locking latch adapted to engage notches in a holding plate 148 to thereby secure the lever and toothed segment in place in whatever position they may be moved into.

Longitudinal movement may be imparted to the said shaft 40 by means of a steering lever 48 which is pivotally supported at 49 from the frame of the tractor, and has a latch mechanism 50 for holding it in whatever position it may be placed; said lever having an arm 51 which is operatively connected with a collar 52 through a pin and slot connection at 53 and said collar being loose upon the shaft 40, so that the shaft may rotate independently of the collar but will be moved longitudinally as said lever 48 is adjusted about its point of pivotal support.

In view of the premises it will be appreciated that upward or downward movement imparted to the speed changing lever 47 will rotate the shaft 40 and move the arms 30, 31, and the friction wheels 28, 29, simultaneously toward or from one another, according to which direction the lever 47 is moved. Movement of the friction wheels in either direction from the neutral central position relative to the discs 19, 20 in which the wheels are shown will result in communicating rotary motion to the driving shafts 18, 18; the shafts being rotated in one direction if the friction discs are moved toward one another from said central position and in an opposite direction if they are moved away from one another, thus providing for the driving of the tractor either in a forward or in a reverse direction. It also follows that when the friction wheels are moved into the central position in which they are illustrated no motion will be communicated to the driving shafts 18, 18, even though the engine is in operation, in which condition of the parts the friction wheels obviously act as brakes and prevent movement of the tractor. As said wheels are moved either inward or outward, however, motion will be communicated to the driving shafts through the said wheels and inasmuch as the speed at which the driving shafts are driven will obviously be dependent in all cases upon the distance from the axes of rotation of the friction discs 19, 20 at which contact occurs between the said discs and the periphery of the friction wheels 28, 29, it follows that the speed at which the tractor is driven may be varied by moving said wheels across the discs in the manner herein explained whatever position outward from the axes of rotation of the discs the wheels may occupy at any given time, and irrespective of whether the tractor is being driven forward or backward at the time in question.

It will also be appreciated that movement of the shaft 40 longitudinally by means of the steering lever 48 will result in increasing the speed at which the driving wheel or wheels upon one side of the tractor are driven and in simultaneously reducing the speed at which the driving wheel or wheels upon the other side of the tractor are driven, thus making provision for the steering of the tractor by sliding the said shaft longitudinally. Thus if the friction wheels 28, 29 be assumed as having been moved apart from one another so that the points of contact between the peripheries of said wheels and the discs 19, 20 will be between the axes of rotation of the said discs and their outer edges, then movement of the shaft 40 to the right will move the friction wheel 29 inward with a resulting decrease in the speed at which the left hand driving shaft 18 is rotated, while at the same time the friction wheel 28 will be moved outward and toward the periphery of the disc 19, with a resulting increase in the rate at which the right-hand driving shaft 18 is driven. It will be appreciated, furthermore, that such a simultaneous variation in the speed at which the driving wheels upon the two sides of the tractor are driven will be produced by longitudinal movement of the shaft 40 irrespective of the position of the friction wheels 28, 29 relative to the axes of rotation of the friction discs, thus providing for the steering of the vehicle in the manner pointed out irrespective of the speed at which the same is driven at any given time, and irrespective of whether the tractor is then being driven in a forward or in a reverse direction.

Figure 7:
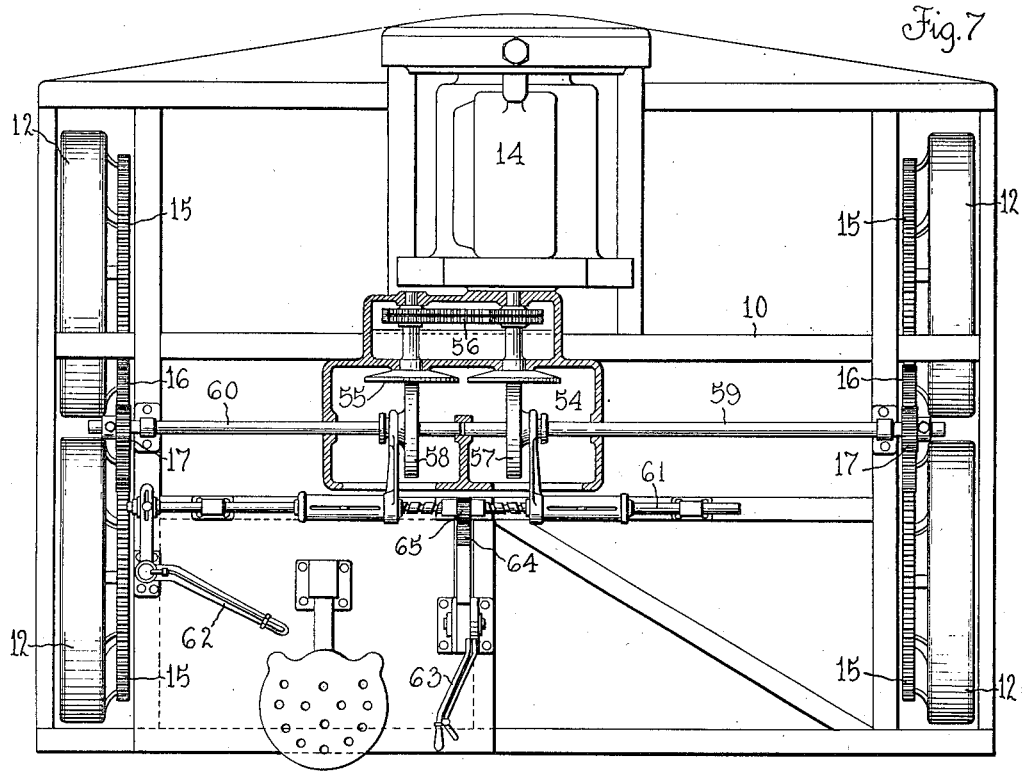
Figure 7 is a view similar to Figure 1, but showing my invention modified as to certain of the features thereof.
Figure 8:
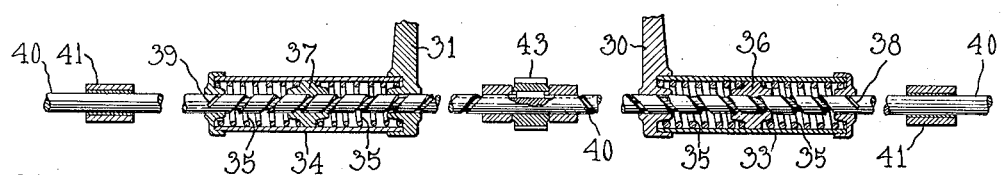
Figure 8 is a sectional view showing certain parts of my invention upon an enlarged scale.

In the modified form of my invention illustrated in Figure 7 the friction driving discs 54, 55 are driven in the same direction through a sprocket chain 56 from the engine 14, and the friction wheels 57, 58 are slidable upon but are non-rotatably connected with the driving shafts 59, 60 through which the driving wheels upon the opposite sides of the tractor are driven. The shaft 61 is a sliding and a rotatable shaft, the same as the shaft 40 in the form of my invention hereinbefore described, and the friction wheels may be moved simultaneously toward and from one another by right and left screws upon the said shaft the same as in the mechanism hereinbefore explained.

It will be appreciated, however, that when the friction discs rotate both in the same direction as in this form of my invention, and when longitudinal movement is imparted to the shaft 61 by means of a lever 62, the said friction wheels will be moved simultaneously to the right or left from the neutral central positions in which they are shown; the points of contact between both the friction wheels and the discs being kept upon one and the same side of the axes of rotation of the respective discs when movement of said friction wheels from their neutral mid position is brought about by shifting the shaft 61 longitudinally. It therefore follows that the two driving shafts 59 and 60 will be rotated both in the same direction, thus securing the driving of the tractor either in a forward or in a reverse direction according to which way the said shaft 61 is moved from its neutral central position, or according to whether the points of frictional engagement between the friction wheels and the friction discs are both upon the right or both upon the left of the axes of rotation of the said discs. The driving action thus secured will be at various speeds according to the distance of the points of contact between the friction wheels and the friction discs from the neutral position shown, the speed at which the tractor is driven being regulated in this form of my invention by means of a speed controlling lever 62 the location of which corresponds with that of the steering lever 48 in the form of my invention first above described.

In the form of my invention here referred to rotary motion imparted to the shaft 61 will, irrespective of the position of the friction wheels relative to the friction discs, act to move the said friction wheels simultaneously, one toward the axis of rotation of one friction disc and the other away from the axis of rotation of the other friction disc; thus providing for the steering of the tractor by means of a steering lever 63, a toothed segment 64, and a pinion 65 with which said segment meshes, the shaft 61 being slidable through said pinion while at the same time it is driven therefrom through a suitable sliding key and key-way connection, or an equivalent mechanism which will permit the shaft to move laterally through the pinion while at the same time maintaining a driving connection between said elements.

It therefore follows that the friction discs of my improved transmission mechanism may be driven in either one and the same or in opposite directions, and that such motion may be communicated to the said discs through and by the use of various forms of gear trains, through sprocket chains and wheel devices, or equivalent driving mechanisms, the particular form of such driving means being a matter of secondary importance so far as concerns the distinguishing features of my invention. When said discs are rotated in opposite directions as in the form of my invention illustrated in Figures 1 and 2 the lever 48 is the one whereby the steering of the tractor is effected, while the lever 47 is the lever which is provided to change the speed at which the tractor is driven. When, however, the said friction discs are rotated in the same direction, as in the form of my invention illustrated in Figure 7, the lever 62 which occupies a position corresponding with that of the lever 48 in the form of my invention first described becomes a lever whereby the speed at which the tractor is driven is regulated, whereas the lever 63 which corresponds with the lever 47 becomes the steering lever. In both forms of the invention rotary motion imparted to the shaft 40 or 61 moves the friction wheels of the device simultaneously toward or from one another, while longitudinal movement imparted to said shafts moves the friction wheels simultaneously, and both in the same direction, across the faces of the friction discs; such movements being in either of two directions from the neutral central position which said shafts occupy when the friction wheels are in line with the axes of rotation of the friction discs.

Figure 3 shows my invention as applied to a tractor in which the position of the front wheels, one of which is shown at 66, is varied by means of a steering wheel 67 as is usual in steering means for motor driven vehicles in which the angular position of the front wheels is changed to effect the steering thereof. In this form of my invention the rear driving wheels 68 are operated through driving shafts extending each way from the center of the tractor, one said driving shafts being designated by the reference numeral 69, and which driving shafts are in all essential particulars the equivalent of the driving shafts 18 in the form of my invention illustrated in Figures 1 and 2; said driving shafts having pinions at their outer ends, one of which is designated by the reference numeral 70, and which pinions engage interiorly toothed annular racks 71 carried one by each of the driving wheels, to thereby communicate motion to said wheels. The driving shafts through which the wheels are driven have each a friction wheel, one of which is shown at 72, adjacent their inner ends and the peripheries of which friction wheels are in engagement with friction discs in all essential particulars like friction discs 19, 20 and one of which discs is designated by the reference numeral 73. In this form of my invention a shaft 74 is operatively connected with the friction wheels to move them simultaneously toward or from one another, the same as in the form of my invention hereinbefore described, rotary motion being communicated to the said shaft through a pinion 75 in driving engagement therewith and with which pinion an oscillating tooth segment 76 engages, said segment being pivotally supported at 77 and the same being operated by an operating lever 78 the same as in the form illustrated in Figures 1 and 2; from which it follows that oscillatory movement communicated to the segment 76 will result in moving the friction wheels simultaneously toward and from one another, with a resulting change in the speed at which the driving shafts are driven, thus controlling the speed of the tractor and also its direction of travel; as the friction discs employed in this form of my improved transmission mechanism are movable simultaneously outward or inward from a neutral central position in which they lie in line with the axes of rotation of the friction discs present in this form of my invention to secure forward or backward driving of the tractor wheels. It will be appreciated, however, that inasmuch as the steering of the tractor in the form thereof illustrated in Figure 3 is effected by means of the steering wheel 67 and the forward wheels 66, no provision has to be made in the transmission mechanism for the steering of the tractor; from which it follows that in this form of my invention the shaft 74 need not be slidable longitudinally, and that the lever 48 employed in the form illustrated in Figure 1 for sliding the shaft in question may be omitted.

In the form of my invention illustrated in Figures 4, 5 and 6 the tractor therein shown is provided with four driving wheels all designated by the reference numeral 79, the two upon the right-hand side being driven from a driving shaft 80 through any suitable gearing while the two upon the left-hand side are driven through a driving shaft 81 likewise through any suitable form of gearing; motion being communicated to said driving shafts through friction wheels 82, 83 which are in sliding and driving engagement with said shafts but which may be moved along the same without interrupting such driving engagement, as hereinbefore explained. The said friction wheels are provided with extending sleeves 84, 85 having each a grooved collar adjacent its outer end and with which the forked extremities of operating arms 86, 87 engage; said arms being carried by sleeves 88, 89 which may be moved simultaneously toward and from one another by right and left-hand threaded portions of a sliding and rotatable shaft 90, and cooperating nuts within said sleeves which engage the said threaded portions, the same as in the form of my invention illustrated in Figures 1 and 2.

The peripheries of the friction wheels 82, 83 are in frictional driving engagement with friction discs 91, 92 which are driven in opposite directions from the crank shaft of the engine through a driving sprocket chain 93 passing about sprocket wheels 94, 95 operatively connected with said friction discs, and also about idler sprocket wheels 96, 97, such an arrangement of driving sprocket chain being employed to secure rotation of the friction disc in opposite directions, as will be appreciated.

In this form of my invention rotary and longitudinal movements are imparted to the shaft 90 to thereby move the friction discs 82, 83 simultaneously toward and from one another to vary the speed at which the tractor is driven, and simultaneously toward the right or left to effect the steering of the tractor, the same as in the form of my invention illustrated in Figures 1 and 2, by means of power operated mechanism controlled by suitable levers actuated by the operator of the tractor; to thereby bring about the shifting of the said shaft and of the friction discs in both the ways herein mentioned by power derived from the engine, the construction and operation of the power operated shifting mechanism illustrated being as follows:

The reference numerals 98, 99 designate two shifting bars which are parallel with one another and with the shaft 90 to be shifted, and the ends of which bars are connected with arms 100 having bearings through which the shaft 90 extends; the said shaft being free to rotate in the said bearings while at the same time longitudinal movement of the shaft relative to the arms is prevented by collars upon the shaft which engage the arms in question, so that longitudinal movement will be communicated to the said shaft when the bars 98, 99 are moved toward the right or left.

Co-operating with and acting to move the shifting bars 98, 99 in the manner above referred to is a double cone-shaped friction member 101 slidable along but non-rotatably connected with the shaft 102 which supports the idler sprocket wheel 97, which friction member is movable along said shaft by means of a rod 103 with which a lever 104 is operatively connected; the connection between the conical friction member and the shaft 102 being such that the said member will be driven by the shaft while at the same time it may slide along the same. It therefore follows that movement of the said friction member 101 toward the right, Figure 6, will cause the same to engage the bar 98 and communicate motion to the shaft 90 in one direction through said bar, while engagement between the said friction member and the bar 99 as said member is moved to the left will communicate motion to the shaft in question in a reverse direction, thus moving the friction wheels 82, 83 simultaneously to the right or left in the manner above explained; the lever 104 whereby the required movement of the rod 90 is brought about, and the steering of the tractor effected, being in this respect the equivalent of the lever 48 in the form of my invention illustrated in Figures 1 and 2.

Rotary motion is communicated to the shaft 90 to change the speed at which the driving shafts 80, 81 are driven by means of a friction member having spaced flanges 105, 106 between which a friction roller 107 lies and which friction roller is upon the end of the shaft 102 above referred to which carries the idler gear 97. This friction member is in sliding and driving engagement with the shaft 90 as through a suitable key and key-way connection which permits the shaft to move through the friction member; and said member itself is shiftable to bring one or the other of the friction flanges 105, 106 into engagement with the driving roller 107 by means of a bell crank lever 108 which is pivotally supported at 109, and with one arm of which the lower end of a lever 110 is operatively connected; said last mentioned lever being for the purpose of effecting a change in speed of the driving of the tractor through the transmission mechanism. The other end of the bell crank lever 108 is operatively connected with the friction member so as to slide the same to the right or left and bring one or the other of the flanges 105, 106 thereof into engagement with the friction roller 107 as above explained; and it follows that when one of said flanges is in engagement with said roller the shaft 90 will be rotated in one direction and the friction wheels 82 and 83 correspondingly moved, while when the other of said friction flanges is moved into engagement with the said roller the shaft will be rotated in a reverse direction, and the friction wheels in question moved in a direction the opposite to that first assumed.

Figures 9, 10:
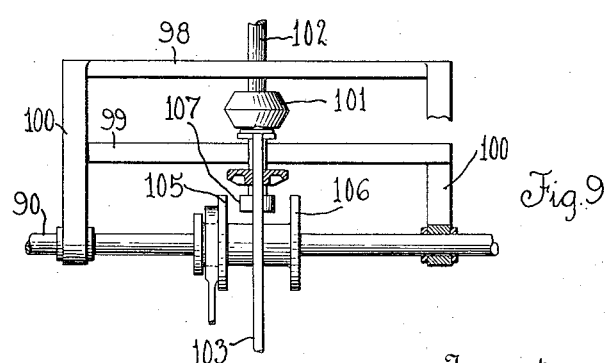
Figure 9 is a fragmentary view showing certain features of my invention upon a larger scale, to better bring out the construction and operation thereof.
Figure 10 is a view showing a detail of my invention.

The driving pinions through which the driving wheels upon opposite sides of the tractor are driven from the two driving shafts, and which are designated by the reference numeral 17 in all the figures, are preferably slidable upon the driving shafts and are provided with set screws 171 in their hubs, see Figure 10, so that upon loosening the set screws the pinions may be slid sidewise and out of mesh with the driving gears, as 16, through which the driving wheels are driven, or removed entirely, thus disconnecting the driving shafts from the driving wheels and permitting the engine and driving mechanism to run without driving the tractor as when the same is to be used for power purposes, and permitting the tractor to be towed without driving the engine should it become necessary or desirable to do so.

Having thus described and explained my invention, I claim and desire to secure by Letters Patent:

1. In a tractor of the class described and in combination with independently driven driving wheels located upon opposite sides of the tractor, two driving shafts each independent of the other and through which said driving wheels are driven, and an engine whereby the tractor is operated; two rotatable friction discs driven by said engine; two friction wheels one operatively connected with each of said shafts and the peripheries of which friction wheels are in engagement one with each of said discs; a rotatable and longitudinally movable shaft having right and left hand threaded portions; two nuts with which said threaded portions engage; means through which movement of said nuts is communicated to said discs; means for imparting rotary motion to said last mentioned shaft; and means for moving said last mentioned shaft longitudinally.

2. In a tractor of the class described and in combination with independently driven driving wheels located upon opposite sides of the tractor and driven through two driving shafts each of which is independent of the other, and an engine whereby the tractor is driven; two rotatable friction discs driven by said engine; two friction wheels one operatively connected with each of said shafts and the peripheries of which friction wheels are in engagement one with each of said discs; two co-operating operating members one driven by the engine and the other operatively connected with said friction wheels; means for causing said members to engage with one another to thereby move said friction wheels across the said friction disc by power derived from the engine; two other co-operating operating members one driven by the engine and the other operatively connected with said friction wheels; and means for moving said last mentioned operating members into engagement with one another to thereby move said friction wheels across said discs by power derived from the engine.

3. In a tractor of the class described and in combination with independently driven driving wheels located upon opposite sides of the tractor and driven through two driving shafts each of which is independent of the other, and an engine whereby the tractor is driven; two rotatable friction discs driven by said engine; two friction wheels one operatively connected with each of said shafts and the peripheries of which friction wheels are in engagement one with each of said discs; means operated by the engine for simultaneously moving said friction wheels in opposite directions across the said friction discs; and means operated by the engine for simultaneously moving said friction wheels in the same direction across the said friction discs.

4. In a tractor of the class described, and in combination with independently driven driving wheels located upon opposite sides of the tractor and driven through two driving shafts each of which is independent of the other, and an engine whereby the tractor is driven; two rotatable friction discs driven by said engine; two friction wheels one operatively connected with each of said shafts and the peripheries of which friction wheels are in engagement one with each of said discs; co-operating operating members one driven by the engine and the other operatively connected with said friction wheels; and means for causing said operating members to engage with one another to thereby move said friction wheels simultaneously across said friction disc by power derived from the engine.

5. In a tractor of the class described and in combination with independently operated driving wheels located upon opposite sides of the tractor and driven through two driving shafts arranged in line with one another and each of which shafts is independent of the other, and an engine whereby the tractor is driven; two friction discs driven by said engine and rotatable about axes disposed at right angles to the common axis of said driving shafts; two friction wheels one operatively connected with each of said shafts and the peripheries of which friction wheels are in engagement one with each of said discs; means including a rotatable shaft having right and left hand threaded portions operatively connected with said friction wheels for simultaneously moving said friction wheels in opposite directions across said friction discs; and means including a lever operatively connected with one end of said rotatable shaft for simultaneously moving said wheels in the same direction across said friction discs.

6. In a tractor of the class described and in combination with independently operated driving wheels located upon opposite sides of the tractor and driven through two driving shafts arranged in line with one another and each of which shafts is independent of the other, and an engine whereby the tractor is driven; two friction discs driven by said engine and rotatable about axes disposed at right angles to the common axis of said driving shafts; two friction wheels one operatively connected with each of said shafts and which wheels are slidable along said shafts, and the peripheries of which friction wheels are in engagement one with each of said friction discs; a rotating shaft having right and left hand screw threaded portions; two nuts in engagement one with each of the threaded portions aforesaid of said shaft; and means for rotating said shaft.

7. In a tractor of the class described and in combination with independently operated driving wheels located upon opposite sides of the tractor and driven through two driving shafts arranged in line with one another and each of which shafts is independent of the other, and an engine whereby the tractor is driven; two friction discs driven by said engine and rotatable about axes disposed at right angles to the common axis of said driving shafts; two friction wheels one operatively connected with each of said shafts and which wheels are slidable along said shafts, and the peripheries of which friction wheels are in engagement one with each of said friction discs; a rotatable and longitudinally slidable shaft; two arms carried by said shaft and operatively connected one with each of said friction wheels; means intermediate said shaft and said arms and through which rotary motion imparted to said shaft will move said arms simultaneously toward and from one another; means for rotating said shaft; and means for imparting longitudinal movement to said shaft.

8. In a tractor of the class described, two independently driven driving shafts arranged in line with one another; two friction discs rotatable about axes disposed at right angles to the common axis of said driving shafts; two friction wheels one operatively connected with each of said driving shafts and which wheels are movable across and the peripheries of which are in engagement one with each of said friction discs; a rotating shaft extending parallel to said driving shafts and having right and left-hand screw threaded portions; two nuts in engagement one with each of the threaded portions of said shafts; two arms carried by said shaft and extending therefrom, and which arms are operatively connected one with each of said friction wheels; means intermediate said nuts and said arms and through which said arms are operated from said nuts; a pinion operatively connected with said rotating shaft; and a toothed member in mesh with said pinion and through which rotary motion may be imparted to said shaft.

9. In a tractor of the class described, two independently driven driving shafts arranged in line with one another; two friction discs rotatable about axes disposed at right angles to the common axis of said driving shafts; two friction wheels one operatively connected with each of said driving shafts and which wheels are slidable one along each of said shafts, and the peripheries of which friction wheels are in engagement one with each of said friction discs; a rotating and longitudinally movable shaft extending parallel with said driving shafts and having right and left-hand screw threaded portions; two nuts in engagement one with each of the threaded portions of said shaft; means whereby said nuts are operatively connected one with each of said friction discs; a pinion operatively connected with said shaft and through which the same is longitudinally movable; an oscillating toothed segment in mesh with said pinion and through which rotary motion may be imparted to said shaft; and a lever operatively connected with said shaft and adapted to impart longitudinal movement thereto.

10. In a tractor of the class described, two driving shafts arranged in line with one another and each of which is independent of the other; two friction discs rotatable about axes disposed at right angles to the common axis of said driving shafts; two friction wheels one operatively connected with each of said driving shafts and which wheels are slidable one along each of said shafts, and the peripheries of which friction wheels are in engagement one with each of said friction discs, a rotating shaft extending parallel with said driving shafts and having right and left-hand screw threaded portions; two sleeves carried by said shaft; two arms extending one from each of said sleeves and the free end of which arms are operatively connected one with each of said friction wheels; two nuts located one within each of said sleeves; two springs located within each of said sleeves and between the inner ends of which said nuts are located; and means for rotating said shaft.

11. In a tractor of the class described, two driving shafts arranged in line with one another and each of which is independent of the other; two friction discs rotatable about axes disposed at right angles to the common axis of said driving shafts; two friction wheels one operatively connected with each of said driving shafts and which wheels are slidable one along each of said shafts, and the peripheries of which friction wheels are in engagement one with each of said friction discs; a rotatable and longitudinally movable shaft extending parallel with said driving shafts and having right and left-hand screw threaded portions; two sleeves carried by said shaft; two springs located within each of said sleeves; two nuts located one within each of said sleeves and between the inner ends of the springs therein; two arms extending one from each of said sleeves and which arms are operatively connected one with each of said friction wheels; means for imparting rotary motion to said rotating and longitudinally movable shaft; and means for imparting longitudinal motion to said shaft.

12. In a tractor of the class described, and in combination with independently driven driving wheels located upon opposite sides of the tractor, two driving shafts each independent from the other and through which said driving wheels are driven, and an engine whereby the tractor is operated; two rotatable friction discs driven by said engine; two friction wheels one operatively connected with each of said shafts and the peripheries of which friction wheels are in engagement one with each of said discs; a rotatable and longitudinally movable shaft having right and left hand threaded portions; two nuts with which said threaded portions engage; means through which movement of said nuts is communicated to said discs; means located adjacent the middle portion of said last mentioned shaft for imparting rotary movement thereto; and means located adjacent one end of said last mentioned shaft for moving the same longitudinally.

In testimony whereof I affix my signature.

LLOYD BLACKMORE.